US012576908B2

(12) United States Patent     (10) Patent No.:     US 12,576,908 B2
Arányi et al.                    (45) Date of Patent:        Mar. 17, 2026

(54) POWER DEMAND AND DEGRADATION INFORMATION PROVISION FOR A STEERING SYSTEM OF A ROAD VEHICLE

(71) Applicants: thyssenkrupp Presta AG, Eschen (LI); Honda Motor Co., Ltd., Tokyo (JP)

(72) Inventors: Miklós Arányi, Rebstein (CH); Adela Béres, Budapest (HU); Péter Kakas, Budapest (HU); Imre Szepessy, Mauren (LI); Munetsugu Hanji, Wako (JP); Yosuke Ojima, Wako (JP); Takaya Yamaguchi, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 18/612,498

(22) Filed: Mar. 21, 2024

(65) Prior Publication Data

US 2024/0246602 A1     Jul. 25, 2024

Related U.S. Application Data

(63) Continuation of application No. PCT/EP2021/076007, filed on Sep. 22, 2021.

(51) Int. Cl.
B62D 5/04          (2006.01)
(52) U.S. Cl.
CPC .................................. B62D 5/0484 (2013.01)
(58) Field of Classification Search
CPC .... B62D 5/0484; B62D 5/001; B62D 5/0481; G06F 11/3013; G06F 11/3058; G06F 11/0739; G06F 11/0754; G06F 11/0796
See application file for complete search history.

(56) References Cited

U.S. PATENT DOCUMENTS

2013/0158755 A1     6/2013     Tang et al.
2014/0257639 A1*     9/2014     Chandy ................ B62D 5/0484
                                                       701/41

(Continued)

FOREIGN PATENT DOCUMENTS

EP          1521697 B1 * 12/2012     ................ B60T 8/96
WO     2004/005096 A1     1/2004

OTHER PUBLICATIONS

Official Communication issued in International Patent Application No. PCT/EP2021/076007, mailed on Jul. 5, 2022.

*Primary Examiner* — Kurt Philip Liethen
(74) *Attorney, Agent, or Firm* — Keating & Bennett, LLP

(57)          ABSTRACT

A method to control a steering system or a sub-system of a road vehicle including a controller to operate in a normal mode with full steering functionality and no quality problems and at least two degraded operation modes with degraded operation of the steering system, the controller including an evaluator including an allocation between degradation levels of the steering system or the sub-system and operation modes, and the method includes determining an overall degradation level for the steering system or the sub-system by collecting single individual degradation levels of the steering system or the sub-system in the evaluator and determining an overall degradation level as a level with a highest degradation of the single individual degradation levels which in a corresponding operation mode provides enough performance of the steering system for an expected maximum power request.

8 Claims, 2 Drawing Sheets

(56) References Cited

U.S. PATENT DOCUMENTS

| | | | |
|---|---|---|---|
| 2020/0186071 A1* | 6/2020 | Moule | H02P 21/14 |
| 2022/0135121 A1* | 5/2022 | John | B62D 6/008 |
| | | | 701/32.9 |

* cited by examiner

POWER DEMAND AND DEGRADATION INFORMATION PROVISION FOR A STEERING SYSTEM OF A ROAD VEHICLE

CROSS REFERENCE TO RELATED APPLICATIONS

This application claims the benefit of priority to PCT Application No. PCT/EP2021/076007 filed on Sep. 22, 2021. The entire contents of this application are hereby incorporated herein by reference.

BACKGROUND OF THE INVENTION

1. Field of the Invention

The present invention relates to methods to control steering systems of road vehicles and to steering systems for road vehicles to perform such methods.

2. Description of the Related Art

In motor vehicles with electromechanical steering systems, degradation is possible and allowed. For steering systems of autonomous vehicles and/or steer-by-wire systems, the requirements and the architecture is different. One of the main requirements is that the steering system has to be fault tolerant, which means that if one failure occurs, the steering system has to continue operating to provide the main functionality.

Degradation or malfunction may occur in one or more individual components and/or sub-systems of the steering system.

Until now, information on the degradation or malfunctioning of individual components and/or sub-systems of the steering system was not collected and evaluated. Overall information on the degradation of the steering system as a unit is lacking, but is necessary to determine the actual operation state of the steering system.

SUMMARY OF THE INVENTION

Example embodiments of the present invention provide methods to control steering systems of road vehicles to determine degradation of steering systems to decide in which state an actual operation state of an overall steering system should be.

A method to control a steering system or a sub-system of a road vehicle including a controller configured or programmed to operate in a normal mode with full steering functionality and no quality problems and at least two degraded operation modes and an evaluator including an allocation between degradation levels of the steering system or the sub-system and operation modes, and the method includes determining an overall degradation level for the steering system or the sub-system by collecting single individual degradation levels of the steering system or the sub-system in the evaluator and determining the overall degradation level as a level with a highest degradation of the single individual degradation levels which in a corresponding one of the operation modes provides enough performance of the steering system for an expected maximum power request.

This method makes it possible to determine an overall degradation level for the system, which is an important value for setting an appropriate operation state. Single individual degradation levels represent individual components and/or sub-systems of the steering system or individual components and/or sub-units of the sub-system.

Preferably, the method includes calculating the expected maximum power request based on a state of the road vehicle state or a state of the steering system.

The operation modes of the controller are preferably defined by value ranges between performance limit values.

In an example embodiment, the method includes determining a power demand defined as a difference between a calculated expected maximum power request and an actual power demand, and modifying the performance limit values based on the power demand.

The determined operation state is thus modified to allow the system to carry out the power demand.

The sub-system of the steering system can be a road wheel actuator or a feedback actuator of a steer-by-wire steering system. In case the steering system is an electromechanical steering system, preferably of an autonomous vehicle, the method is carried out for the complete steering system. If a redundant electromechanical steering system is present, the method can be carried out for one or both redundant systems.

Preferably, the individual degradation levels include at least one of a voltage based degradation level, a current based degradation level, a failure/diagnostic based degradation level, or a temperature based degradation.

It is possible that the determined overall degradation level is used to warn a driver or transmitted to another controller or a decision logic in the vehicle.

Further, a steering system for a road vehicle including a controller configured or programmed to perform the above described method is provided. The steering system is preferably a steer-by-wire steering system or an electromechanical steering system of an autonomous road vehicle.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will now be described with reference to the drawings.

DETAILED DESCRIPTION OF THE EXAMPLE EMBODIMENTS

Figure 1:
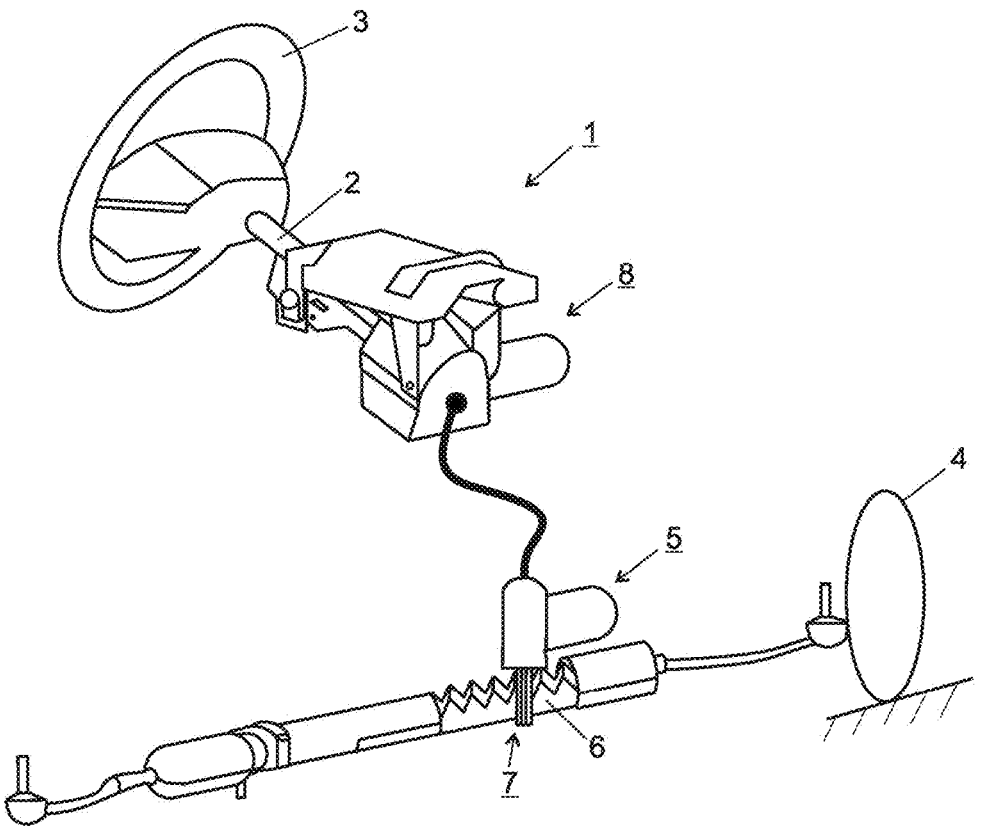
FIG. 1 is a schematic view of a steer-by-wire steering system.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a rack-and-pinion gear 7.

When a driver operates the steering wheel 3, the steering shaft 2 is rotated, which is detected by a shaft sensor, which is not shown in the drawings. A controller is configured or programmed to calculate an operation signal for the road wheel actuator 5 from the signal detected by the shaft sensor. By operating the gear rack 6 with the operation signal, the road wheels 4 are turned. At the same time, forces introduced in the gear rack 6 from the road wheels 4 are estimated based on the road wheel actuator signals or recognized by another sensor not shown in the drawings, and a feedback signal is calculated, which is applied to the steering shaft 2 by a steering wheel actuator 8, also called a feedback actuator, so that the operator can recognize the feedback in the steering wheel 3.

The steer-by-wire steering system 1 includes at least one controller (not depicted) which is configured or programmed to have different modes of operation, a normal mode and degraded modes. If a malfunctioning in the system occurs, degradation might take place. An evaluator (also not shown) evaluates the state of performance degradation of the steering system. According to the evaluation result of the evaluator, the operation mode of the controller is set. The steering system includes multiple degradation functions and thus resulting degradation levels which reflect degradation or malfunction in individual components and sub-systems of the steering system. Degradation functions are, for example, available for temperature sensors, diagnostics, voltage of the power supply, current and/or degradation caused by a temporary or permanent failure of individual components or sub-systems.

Figure 2:
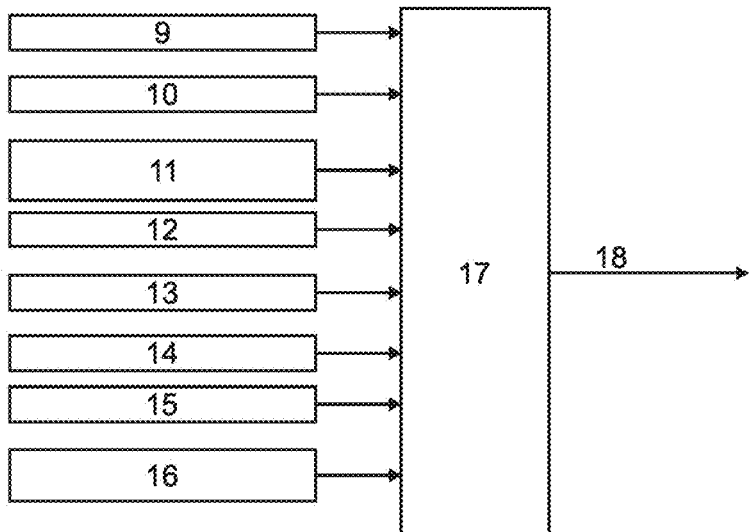
FIG. 2 is a schematic diagram of a degradation summarizer.

FIG. 2 shows a block diagram of a portion of a control method. The method can be applied to a steer-by-wire steering system, in particular, the feedback actuator and/or the road wheel actuator and to electromechanical steering systems with external interfaces like lane keeping, autonomous driving, or any other interface which requires a steering system operation. The single individual degradation levels 9,10,11,12,13,14,15,16 are collected in the evaluator 17. Reference numeral 9 represents the voltage based degradation level, reference numeral 10 represents the current based degradation level, reference numeral 11 represents a failure/diagnostic based degradation level, reference numeral 12 represents another degradation level, reference numerals 13 to 15 represent temperature based degradation levels, and reference numeral 16 represents another degradation level.

The evaluator, also called a degradation summarizer, determines an overall degradation level 18 for the respective system based on which the operation mode of the controller is set. The overall degradation level 18 is chosen to be the level with the highest degradation of all individual components and/or sub-systems which in the corresponding operation mode of the controller still offers enough performance for an expected maximum power request. The maximum power request of the steering system can be, for example, an emergency steering maneuver or a parking situation.

The expected maximum power request is calculated based on the vehicle state and an internal steering system state like an external load or an internal mechanical friction, etc. The calculated expected maximum power request makes it possible to determine a power demand defined as the difference between the expected maximum power request for the nominal system and the actual maximum power demand. In other words, the system sizing is performed for the nominal system, but it may be that the actual expected maximum power request is higher or even lower because of changes in the environment or some changes of the vehicle, etc.

The operation modes of the controller are defined by sections between performance limit values.

The performance limit values may be modified based on the calculated power demand information.

Figure 3:
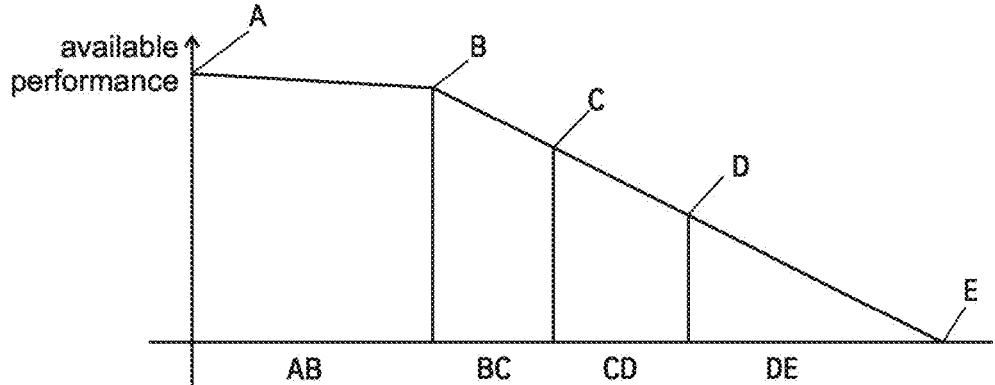
FIG. 3 is a diagram of performance degradation of the steering system.

In one example embodiment, which will be described in detail below with reference to FIG. 3, the controller preferably is configured or programmed to include four operation modes (AB,BC,CD,DE), for example.

A,B,C,D,E represent available performance limit values. AB, BC, CD, DE represent the various modes of operation.

Operation mode AB is the normal mode. The available performance of the steering system is so high such that all driving maneuvers can be carried out and there are no limitations. A equals 100% of available performance, B lies in a range between 90% and 99% of available performance, preferably B is 95%, for example.

Operation mode BC is a first degraded mode with degraded operation, in which, all driving maneuvers are possible but quality problems may occur, namely that the driver can feel a small delay in vehicle movement compared to steering wheel movement. C lies in a range between 60% and 90% of available performance, preferably at 70%, for example.

An information output interface is used to notify the driver of the degraded operation. The information output interface controls at least one notifier such as a vehicle display or a speaker, for example. A steering wheel can also be used to give feedback, for example, by vibration or by modifying a virtual gear ratio of a steer-by-wire steering system or by increasing the feedback given by a feedback actuator of a steer-by-wire steering system. The notifier can also be combined.

The driver is thus notified by the notifier and can then decide to immediately park the car and call towing service or to drive to the workshop to fix the problem.

Operation mode CD is a second degraded mode with degraded operation, in which, all driving maneuvers are possible but quality problems may occur. D lies in a range between 30% and 70% of available performance of the steering system, for example. In order to maintain full vehicle controllability, the vehicle is forced to travel within a predetermined vehicle speed range with a speed limit.

Such a medium vehicle speed allows to prepare for further degradation of the steering system, for example, loss of function of a road wheel actuator.

Feedback is given to the driver to provide notification of the degraded operation mode of the steering system as described above.

The fourth operation mode DE is a third degraded mode functioning as an emergency mode. E equals zero available performance. Steering functionality is highly limited because the performance is too low to provided steering functionality for most driving maneuvers. The vehicle is forced to travel within a predetermined vehicle speed range with a speed limit allowing to safely stop the car. Further, the system may provide information about a degradation state and a vehicle level external actuator (e.g., a drivetrain and/or a brake) can help to control the vehicle lateral motion.

Feedback is given to the driver to provide notification of the emergency mode of the steering system. The feedback can be given as described above.

The described concept of several operation modes can be used in all steering systems in case of degradation. The operation does not to be necessary fault tolerant. In the case that the system is not fault tolerant but the probability of the first fault is such a low value, the concept can be used as well.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steering system or a sub-system of a road vehicle including a controller configured or programmed to operate in a normal mode with full steering functionality and no quality problems and at least two degraded operation modes with degraded operation of the steering system and an evaluator including an allocation between degradation levels of the steering system or the sub-system and operation modes, the method comprising:

determining an overall degradation level for the steering system or the sub-system by collecting single individual degradation levels of the steering system or the sub-system in the evaluator;

determining the overall degradation level as a level with a highest degradation of the single individual degradation levels which in a corresponding one of the operation modes provides enough performance of the steering system for an expected maximum power request;

warning a driver of the road vehicle or transmitting the overall degradation level to another controller or a decision logic in the road vehicle when the overall degradation level is determined to correspond to an operation mode with degraded performance; wherein the steering system or the sub-system of the road vehicle includes a road wheel actuator which operates a gear rack via a rack-and-pinion gear.

2. The method according to claim 1, further comprising calculating the expected maximum power request based on a state of the road vehicle and a state of the steering system.

3. The method according to claim 1, wherein the operation modes of the controller are defined by value ranges between performance limit values.

4. The method according to claim 3, further comprising:

determining a power demand defined as a difference between a calculated expected maximum power request and an actual power demand; and modifying the performance limit values based on the power demand.

5. The method according to claim 1, wherein the sub-system of the steering system includes the road wheel actuator.

6. The method according to claim 1, wherein the individual degradation levels include at least one of a voltage based degradation level, a current based degradation level, a failure/diagnostic based degradation level, or a temperature based degradation.

7. A steering system for a road vehicle including a controller configured or programmed to perform the method according to claim 1.

8. The steering system according to claim 7, wherein the steering system is a steer-by-wire steering system.

* * * * *